(12) United States Patent
Miller

(10) Patent No.: US 6,486,575 B2
(45) Date of Patent: Nov. 26, 2002

(54) MOLDED ROTOR BLOCKING AND OTHER MOLDED ARTICLES OF MANUFACTURE

(76) Inventor: Mark Lee Miller, 3249 Arden Villas Blvd., #15, Orlando, FL (US) 32817

( * ) Notice: Subject to any disclaimer, the term of this patent is extended or adjusted under 35 U.S.C. 154(b) by 48 days.

(21) Appl. No.: 09/760,694

(22) Filed: Jan. 16, 2001

(65) Prior Publication Data

US 2002/0093253 A1 Jul. 18, 2002

(51) Int. Cl.$^7$ ................................. H02K 3/46
(52) U.S. Cl. ................ 310/43; 310/270; 310/214; 310/52
(58) Field of Search ................ 310/43, 270, 214

(56) References Cited

U.S. PATENT DOCUMENTS

| | | | |
|---|---|---|---|
| 2,994,735 A | | 8/1961 | Marshall et al. |
| 3,562,569 A | | 2/1971 | Koechlin |
| 3,694,907 A | | 10/1972 | Margrain et al. |
| 3,819,967 A | | 6/1974 | Binder |
| 4,160,178 A | | 7/1979 | Smith et al. |
| 4,163,166 A | * | 7/1979 | Kamiya ................ 310/215 |
| 4,200,818 A | | 4/1980 | Ruffing et al. |
| 4,241,101 A | | 12/1980 | Saunders et al. |
| 4,275,324 A | | 6/1981 | Flick |
| 4,368,399 A | | 1/1983 | Ying et al. |
| 4,390,806 A | | 6/1983 | O'Brien et al. |
| 4,427,907 A | * | 1/1984 | Flick ..................... 310/52 |
| 4,443,725 A | | 4/1984 | Derderian et al. |
| 4,486,676 A | * | 12/1984 | Moore .................... 310/52 |
| 4,582,723 A | | 4/1986 | Markert et al. |
| 4,656,382 A | | 4/1987 | Moore et al. |
| 4,818,909 A | * | 4/1989 | Blake .................... 310/208 |
| 5,015,895 A | | 5/1991 | Obley |
| 5,106,924 A | | 4/1992 | Smith et al. |
| 5,346,568 A | | 9/1994 | Gsellmann |
| 5,349,259 A | | 9/1994 | Kaneko et al. |
| 5,365,135 A | | 11/1994 | Konrad et al. |
| 6,346,754 B1 | * | 1/2002 | Kieda .................... 310/58 |

FOREIGN PATENT DOCUMENTS

| | | |
|---|---|---|
| EP | 0413179 | 2/1991 |
| GB | 971525 | 9/1964 |
| GB | 2299217 | 9/1996 |

* cited by examiner

Primary Examiner—Nestor Ramirez
Assistant Examiner—I A Mohandesi

(57) ABSTRACT

A molded rotor block, as well as other molded articles of manufacture, are made from a resin material selected from the group consisting of epoxy thermosets, polyester thermosets, phenolic, and melamine; and a reinforcement material selected from the group consisting of glass and mineral filler. The article of manufacture is adapted to withstand temperatures that range from about −40° C. to about 180° C.−40° C. and to withstand centrifugal loading at about 1500 RPM to about 4500 RPM while functioning as an insulator. The molding operation provides many advantages over CNC machining and other manufacturing methods.

21 Claims, 4 Drawing Sheets

MOLDED ROTOR BLOCKING AND OTHER MOLDED ARTICLES OF MANUFACTURE

FIELD OF THE INVENTION

The present invention relates in general to a molded article of manufacture and, more particularly, to a molded rotor blocking for use in a turbine generator within power generation plants.

BACKGROUND OF THE INVENTION

Many power generation plants produce electricity by converting energy (e.g. fossil fuel, nuclear fusion, hydraulic head and geothermal heat) into mechanical energy (e.g. rotation of a turbine shaft), and then converting the mechanical energy into electrical energy (e.g. by the principles of electromagnetic induction). Some of these power generation plants, such as a fossil-fuel power generation plant, comprise a turbine, a generator and an exciter.

One aspect of the above-described power generation scheme involves use of rotor blockings to support, separate and insulate conductive windings in the generator rotor. The rotor blockings must withstand temperatures that can range from about −40° C. to about 180° C. and more typically from about −10° C. to about 140° C, and centrifugal loading at about 1500 RPM to about 4500 RPM and more typically at about 2000 RPM to about 3500 RPM. The rotor blockings come in a variety of sizes and shapes, and may also include channels that direct a flow of cooling fluid (e.g. air, hydrogen) over the conductive windings during generator operation. The rotor blocking should also be resistant to oil which is used for rotor shaft lubrication, as well as other detrimental substances found within the rotor.

As shown in FIGS. 1, heretofore, rotor blockings, and other articles of manufacture, typically have been constructed from a glass 10 and resin 12 composite material that is formed into laminate sheets 14 such as NEMA G-9 melamine-glass fabric, NEMA G10 and G11 epoxy-glass fabric, and NEMA GPO glass-polyester. These resin treated glass sheets 14 are stacked upon each other and orientated relative to each other to maximize the overall physical properties of the overall anisotropic composite material. The sheets 14 are then pressed during curing to achieve high temperature properties suitable for operation up to about 180° C. The cured composite material is in the form of planar plates.

The cured composite material is then processed by CNC. machining or other similar means to form the composite material into the desired rotor blocking size and shape. The unused portions of the composite material are usually thrown away because recycling anisotropic composite scrap material is difficult and expensive.

There are many shortcomings, however, to the above-described rotor blocking and manufacturing process. One shortcoming involves the limited ways in which fibers within each layer of resin-glass fabric can be oriented with respect to the other resin-glass fabric layers and fibers. Another shortcoming involves the difficulty of incorporating materials other than sheets of resin or glass into the overall composite structure. Another shortcoming involves the relatively high cost of laminated plates of resin-glass fabric and the relatively high cost of CNC. machining a resin-glass material. For example, it costs several thousands of dollars of machine time and material costs to make a set of rotor blockings for a turbine generator, and laminate scrap from CNC. machining can constitute about 20–70% of the finished rotor block weight which adds up to thousands of dollars per turbine generator. Another shortcoming involves the significant number of rotor blocking defects caused by CNC. machining a resin-glass material, such as delamination, cracking and surface fracturing. Also, machining laminated materials degrades certain physical properties, such as strength and fatigue resistance. Another shortcoming involves the significant amount of space and number of operators needed to make rotor blockings by CNC machining a resin-glass material.

There is thus a need for an improved rotor blocking and an improved method of making a rotor blocking. There is also a more general need for an article of manufacture capable of withstanding temperatures that can range from about −40° C. to about 180° C. and preferably from about −10° C. to about 140° C., centrifugal loading at about 1500 RPM to about 4500 RPM and preferably at about 2000 RPM to about 3500 RPM while functioning as an insulator, and for a method of easily, flexibly, and inexpensively manufacturing that article.

SUMMARY OF THE INVENTION

The present invention provides a molded rotor blocking, or other article of manufacture, capable of withstanding temperatures that can range from about −40° to about 180° C. and preferably from about −10° C. to about 140° C., centrifugal loading at about 1500 RPM to about 4500 RPM and preferably at about 2000 RPM to about 4500 RPM, while functioning as an insulator. The rotor blocking is advantageously constructed of a thermoset resin matrix having glass fiber reinforcements embedded therein and manufactured from a molding process that can easily, flexibly and inexpensively form the rotor blocking into a desired size and shape.

The present invention also provides a relatively unlimited number of ways to arrange glass fibers or other reinforcements within a resin, and an easy way to incorporate materials other than sheets of thermoset prepreg into an overall composite structure.

The present invention also provides a composite material constructed from relatively low cost materials and made from a relatively low cost manufacturing process. For example, molding and material costs to make a set of rotor blockings for a turbine generator are just a few thousand dollars, and a negligible amount of raw material scrap is created.

The present invention also reduces, if not prevents, defects and degradation inherent from machining laminated composite materials, such as delamination, cracking, and fatigue resistance. Moreover, the present invention has a tougher skin layer that resists fracture initiation and provides stronger strength values versus machined parts under flexural, shear or torsional loading.

One aspect of the present invention thus involves a molded article of manufacture, comprising, a resin material selected from the group consisting of epoxy thermosets, polyester thermosets, cyanate ester, bismaleimide, phenolic, and melamine; and a reinforcement material selected from the group consisting of glass and mineral filler; wherein the molded article of manufacture is adapted to withstand temperatures that range from about −40° C. to about 180° C. and preferably from about −10° C. to about 140° C., and to withstand centrifugal loading at about 1500 RPM to about 4500 RPM at preferably at about 2000 RPM to about 3500 RPM while functioning as an insulator.

Another aspect of the present invention thus involves a molded rotor block adapted for use in a generator within a power generation unit, comprising, at least one thermoset resin material with a glass transition temperature above a maximum operating temperature of a conductive winding located within the generator; and at least one reinforcement material adapted to provide the molded rotor block with a suitable stiffness and strength to inhibit damage to the molded rotor block damage during normal operation of the generator.

Another aspect of the present invention thus involves a method of making of molded article of manufacture adapted to withstand temperatures that range from about negative 40° C. to about 180° C. and preferably from about negative 10° C. to about 140° C., and to withstand centrifugal loading at about 1500 RPM to about 4500 RPM and preferably at about 2000 RPM to about 3500 RPM while functioning as an insulator, comprising, placing a reinforcement material within a mold cavity; placing a resin material to the mold cavity; heating the mold cavity to a temperature of at least about 100° C. for at least about 40 minutes to form the molded article of manufacture; and removing the formed molded article of manufacture from the mold cavity.

Further aspects, features and advantages of the present invention will become apparent from the drawings and detailed description of the preferred embodiment that follows.

BRIEF DESCRIPTION OF THE DRAWINGS

The above-mentioned and other concepts of the present invention will now be addressed with reference to the drawings of the preferred embodiments of the present invention. The illustrated embodiments are intended to illustrate, but not to limit the invention. The drawings contain the following figures, in which like numbers refer to like parts throughout the description and drawings and wherein.

DETAILED DESCRIPTION OF THE PREFERRED EMBODIMENTS

The invention described herein employs several basic concepts. For example, one concept relates to an article of manufacture comprising a resin material having reinforcement material embedded therein. Another concept relates to a composition made of component materials that can be arranged in a relatively unlimited number of ways with respect to each other, and that can incorporate a variety of materials into its overall composite structure. Another concept relates to a molded article of manufacture having properties particularly suited for use in a power generation plant, but which can also be used in a variety of other fields and for a variety of other uses.

The present invention is disclosed in context of an exemplary rotor blocking used within a generator of a power generator plant. The principles of the present invention, however, are not limited to rotor blockings, and can be used in connection with other power generation components that have similar temperature, loading, and/or insulation requirements, such as stator wedges, support braces, main lead wall panels, rotor filler blocks, and the like. It will be understood by one skilled in the art, in light of the present disclosure, that the present invention disclosed herein can also be successfully utilized in connection with other machine components and articles of manufacture outside the power generation field that have similar temperature, loading, and/or insulation requirements, such as motors, insulators, and structures that require or provide support and/or separation. One skilled in the art may also find additional applications for the composition, components, configurations and methods disclosed herein. Thus, the illustration and description of the present invention in context of an exemplary rotor blocking is merely one possible application of the present invention. However, the present invention has been found particularly suitable in connection with a rotor blocking.

Figure 1A:
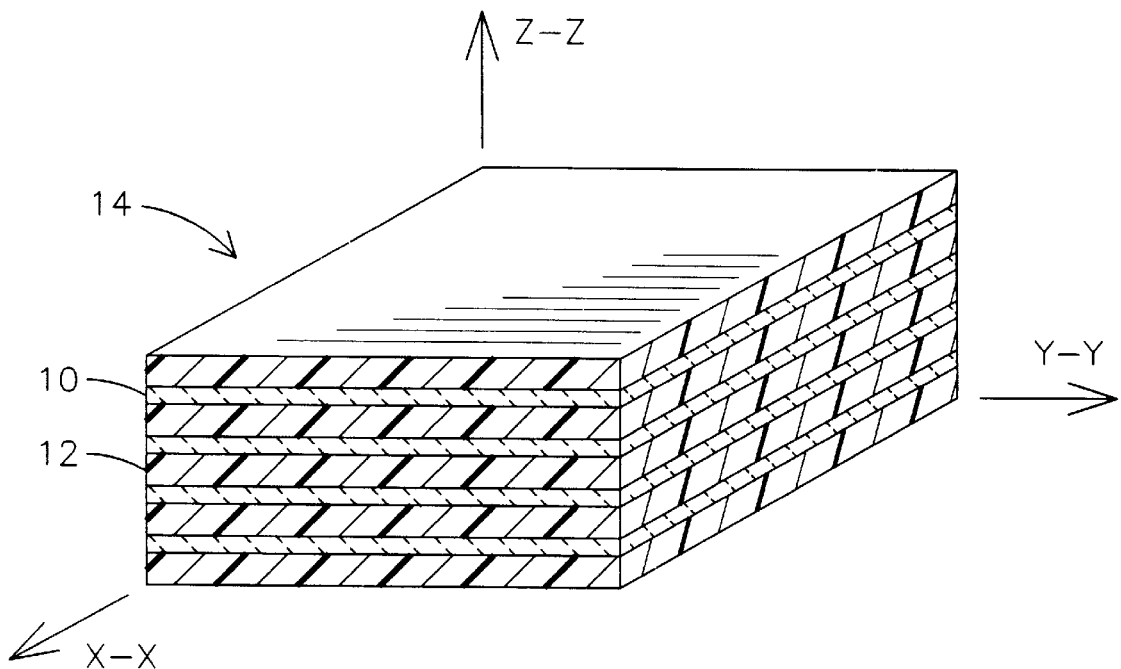
FIG. 1A is a perspective view of a prior art composite material used to make rotor blockings and other articles of manufacture.
Figure 1B:
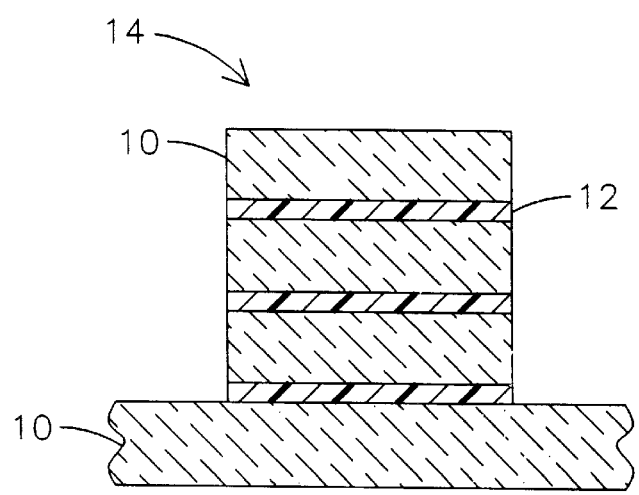
FIG. 1B is a detail side elevation view of the prior art composite material, showing a raised portion of the composite material.
Figure 4A:
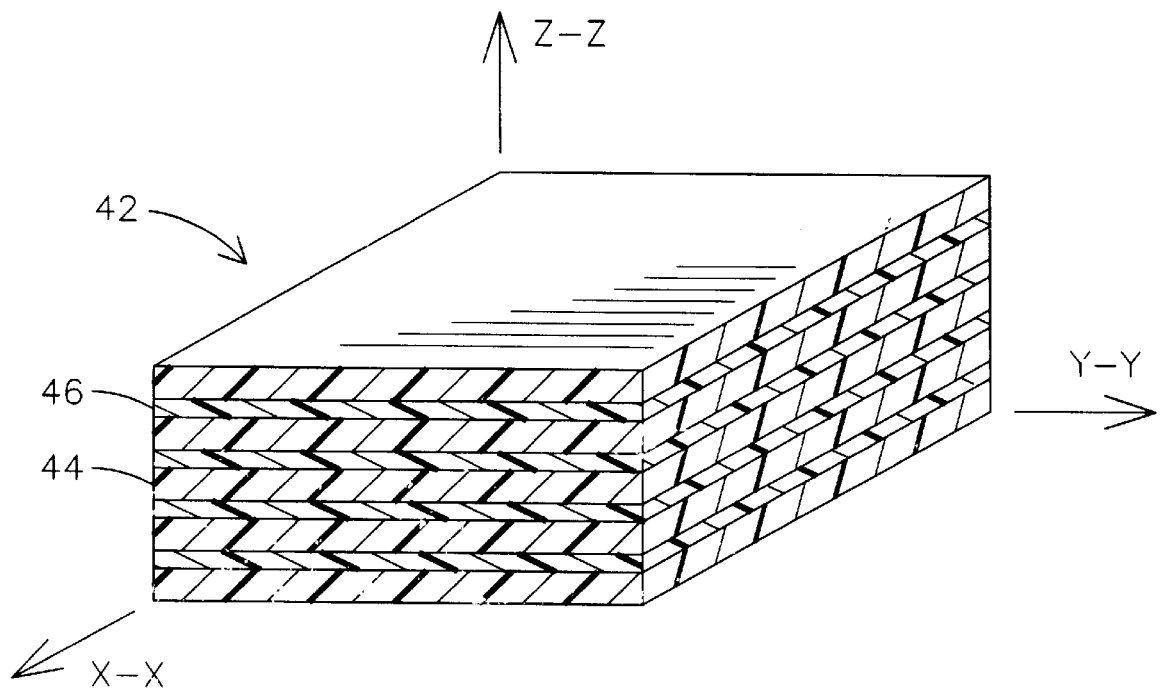
FIG. 4A is a perspective view of a composite material of the present invention.

To assist in the description of the invention described herein, the following terms are used. Referring to FIGS. 1A and 4A, a "longitudinal axis" (X—X) extends along a length of the article 14, 42. A "lateral axis" (Y—Y) extends along another length of the article 14, 42 transverse axis" (Z—Z) extends normal to both the longitudinal and lateral axis, and provides the third or depth dimension of the article 14, 42. In addition, as used herein, the "longitudinal direction" refers to a direction substantially parallel to the longitudinal axis, the "lateral direction" refers to a direction substantially parallel to the lateral axis, and the "transverse direction" refers to a direction substantially parallel to the transverse axis.

Figure 2:
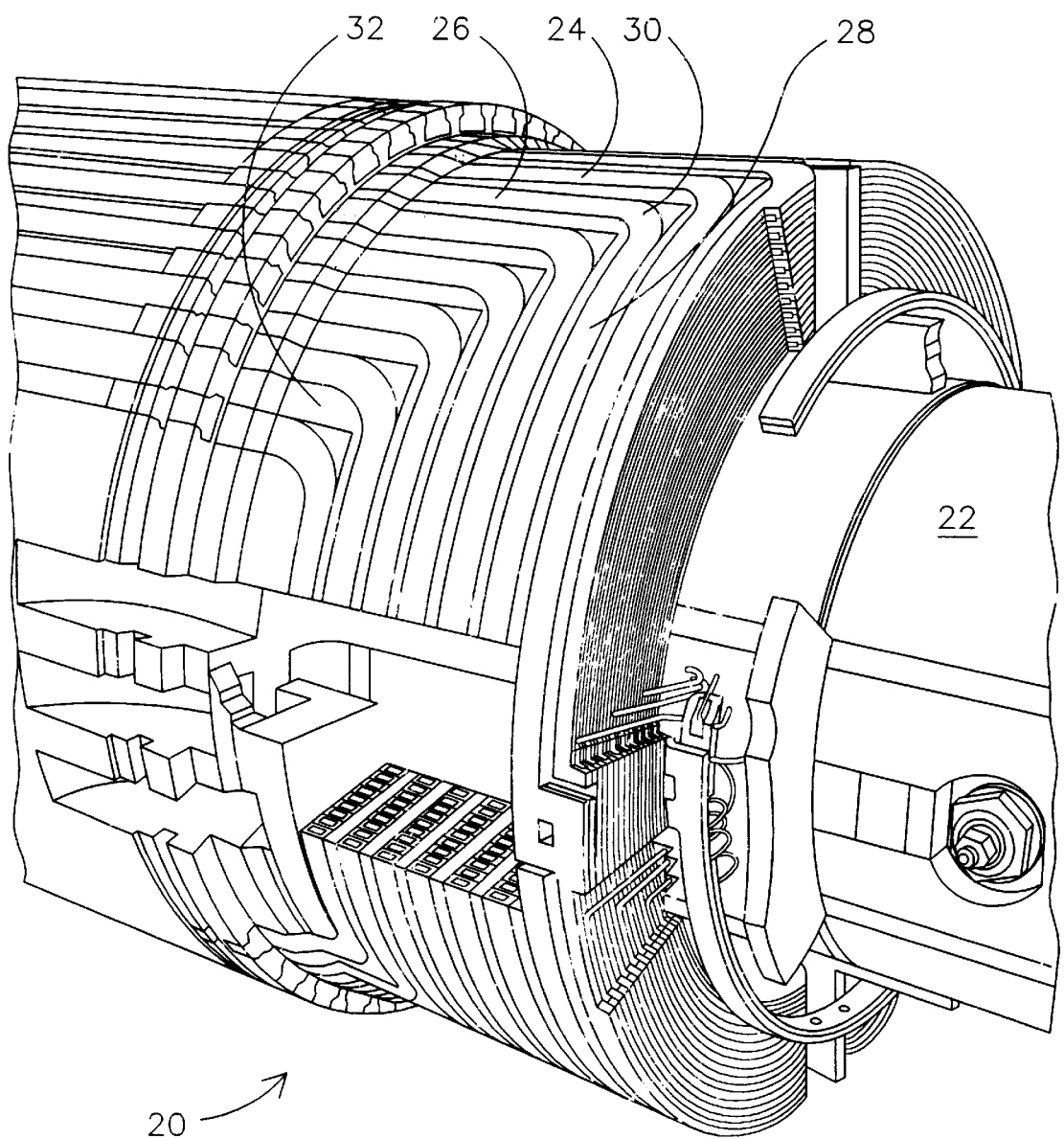
FIG. 2 is a cutaway perspective view of an end portion of a generator, showing a plurality of rotor blockings arranged between conductive windings.

FIG. 2 shows an end portion of a generator rotor 20 shaft 22 with a plurality of rotor windings 24 arranged toward an end of the rotor 20. The windings 24 having a longitudinal portion 26 that extends in the longitudinal (X—X) direction of the shaft 22 and an end turn portion 28 that extends in a radial direction near the end of the shaft 22. A bend portion 30 can be used to connect the longitudinal portion 26 with the end turn portion 28. The conductive windings 24 can be formed from a unitary conductive element or from a plurality of conductive elements.

Figure 3A:
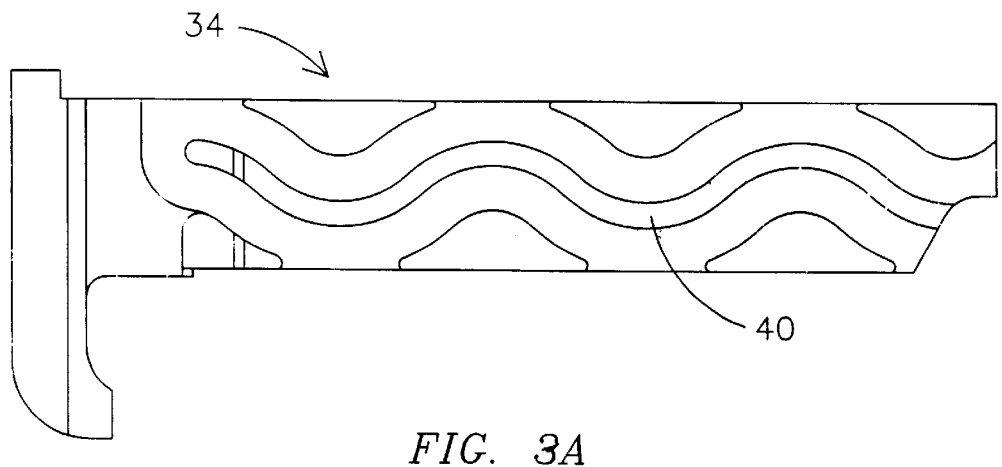
FIG. 3A is a perspective view of an exemplary rotor block configuration.
Figure 3B:
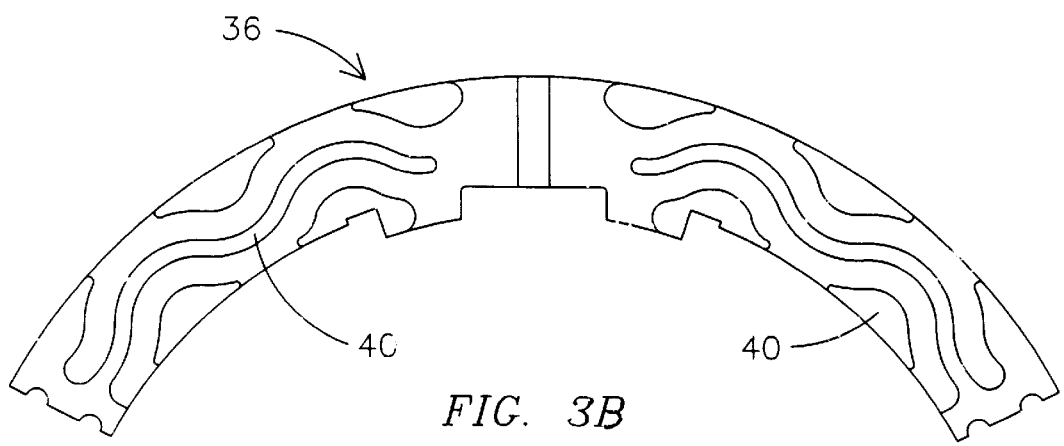
FIG. 3B is a perspective view of another exemplary rotor block configuration.
Figure 3C:
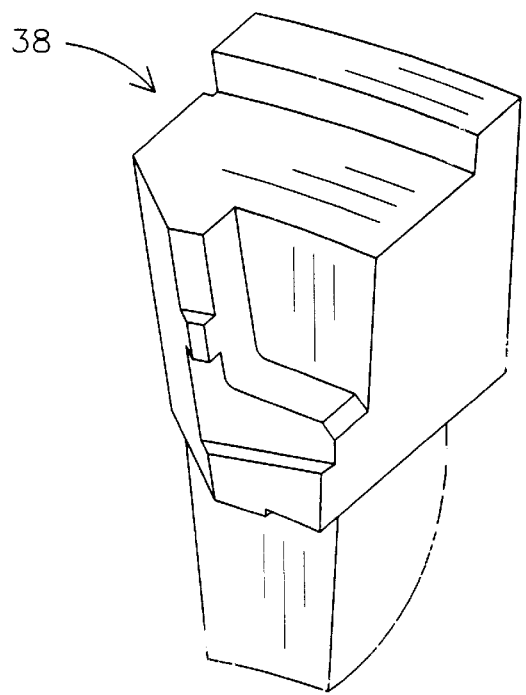
FIG. 3C is a perspective view of another exemplary rotor block configuration.

Rotor blockings 32 are fitted between the conductive windings 26. Each rotor blocking 32 is configured to occupy a space between conductive windings 24 to support and separate the conductive windings 24. The rotor blockings 32 can take on any of a wide variety of sizes and shapes, depending upon the particular portion of the particular windings 24 that they are arranged between. For example, the rotor blocking 32 may have a generally rectangular shape to fit between straight windings segments, commonly termed an axial blocking 34 (FIG. 3A), a generally arcuate shape to fit between curved winding segments, commonly termed a radial blocking 36 (FIG. 3B), or a generally wedged shape to fit between angled winding segments, commonly termed a pill blocking 38 (FIG. 3C). Still referring to FIGS. 3A–3C, the rotor blockings 34, 36, 38 can include a variety of geometries, and have curved, angled, and linear portions, which make their manufacture quite difficult. The rotor blockings 32 may also include channels 40 to direct a flew of cooling fluid (e.g. air, hydrogen) that cools the conductive windings 24 during generator operation.

Composition

Figure 4B:
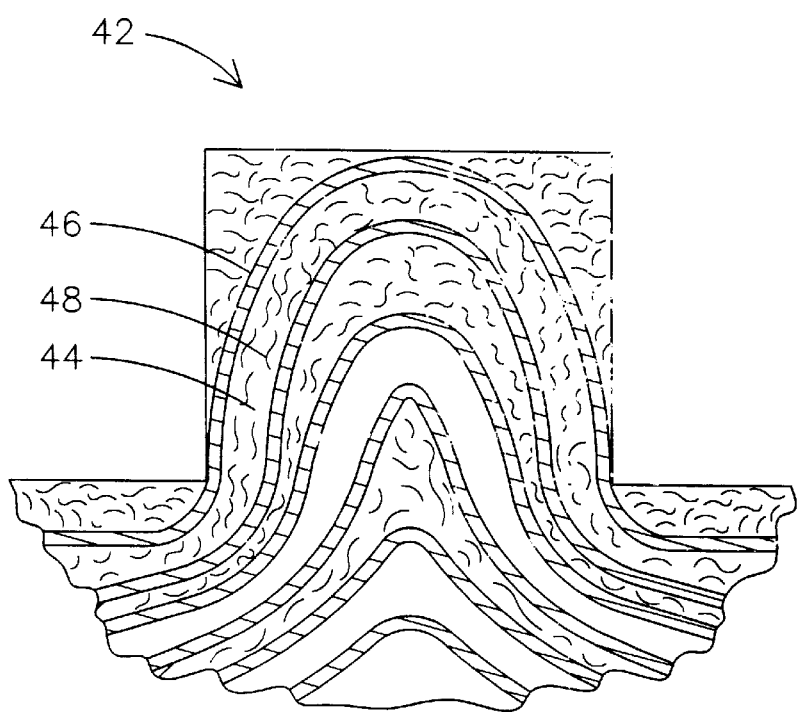
FIG. 4B is a detail side elevation view of the composite material of the present invention, showing a raised portion of the composite material.

Referring to FIGS. 4A and 4B, the rotor blocking is made of a composition 42 comprising at least one resin material 44 and at least one reinforcement material 46. of course, more than one resin and/or reinforcement material 44, 46 may be used. For example, a plurality of resins can be used to combine the material properties of each resin and form a resin having other desirable properties, such as blending a resin having high stiffness with a resin having good strain to failure to form a resin that also functions as a toughening agent. Also, depending of the particular application, the composition may include other optional materials.

The resin material 44 provides an overall generally insulative structure, preferably in a matrix form, to hold and maintain the reinforcement material 46 substantially in place within the rotor blocking. The resin material 44 is advantageously thermoset with a glass transition temperature above the maximum operating temperature of the rotor winding (typically about 140° C. to about 180° C.) to maintain the integrity and properties of the rotor block. The resin material 44 is also advantageously capable of being processed as a low viscosity liquid in order to coat the reinforcement material 46 and have low solubility to trapped volatiles that would otherwise create voids in the rotor blocking during processing. The resin material 44 viscosity also advantageously decreases during heating until the thermoset reaction starts (which permanently raises the viscosity until full cure is achieved), because a decrease in viscosity allows densification of the rotor blocking by removing or pressing out excess resin material 44.

Suitable resin material 44 includes epoxy thermosets, polyester thermosets, cyanate ester, bismaleimide, phenolic, melamine, and the like. More specifically, novalac and anhydride epoxies, and polyester and vinyl esters can be used. These resin materials are commercially available from the Ciba Specialty Chemicals company, the Dow Chemical company and the Reichold, Inc. company. It will be understood by one skilled in the art that, depending on the particular article of manufacture, and the properties that are advantageous to that article of manufacture, other resin materials could be used, such as thermoplastics.

The reinforcement material 46 provides mechanical properties that the resin material 44 cannot achieve, such as stiffness and strength which is advantageously at least about 50 $GN/mm^2$, but could be as high as 1000 $GN/mm^2$ or higher. The reinforcement material 46 is also advantageously electrically insulative to help inhibit electrical conduction along the surface of the rotor blocking, which could otherwise cause turn-to-turn shorts in the conductive winding.

Suitable reinforcement material 46 includes glass and mineral filler. More specifically, fibers or particles of E-glass, S-glass, calcia, magnesia or alumina can be used. These reinforcement materials are commercially available from BGF Industries, Inc. company, the Anchor Reinforcements company and the Hexcel Schwebel company. The reinforcement material 46 advantageously can be arranged into the rotor blocking in a variety of ways, such as in sheets, balls, layers, sections, fibers, particles and the like. Preferably, the reinforcement material 46 can take the form of sheets as well as fibers 48 that can be embedded into the resin material 44 or sheets. One such suitable material is S-glass or E-glass, which can be arranged into sheets and also arranged into woven fabrics, roving matte, fleece, short fibers, or chopped fibers. Also, inorganic fibers or particles are preferred because of their high stiffness, low cost, and ease of processing. It will be understood by one skilled in the art that, depending on the particular article of manufacture, and the properties advantageous to that article of manufacture, other reinforcement materials 46 could be used, such as thermoplastics, and other ceramics.

It has been found that, for at least a typical rotor blocking application, at least about 20% and preferably at least about 50% of the weight of the resin/reinforcement composite material 42 should advantageously comprise the reinforcement material 46. This weight ratio inhibits degradation of the physical properties of the composite 42 versus temperature. Also, the reinforcement material 46 tends to be less expensive than the resin material 44.

Also, as noted above, the glass transition temperature of the resin material 44 advantageously should be greater than the uppermost temperature in which the rotor blocking operates (typically about 140° C. to about 180° C.). This is because the above-identified resin materials typically have viscoelastic characteristics that affect the physical properties of the composite material, such glass transition temperature, which indicates modulus versus temperature. If the composite 42 is heated above the glass transition temperature, then the stiffness and other physical properties of the composite rapidly decreases. For at least this reason, the resin material 44 should advantageously operate in glassy, rigid temperature region and not above, which can result in rapid failure of the rotor block.

Further, for at least a rotor blocking application, the resin material 44 should be selected to inhibit shrinkage during curing, which occurs in the molecular structure. Most thermoset resin matrices have low shrinkage because of their side chain molecules and typical cross-link high cross-link density at full cure. Adding an inorganic reinforcement helps to dimensional stabilize the composite because of its inherent low coefficient of thermal expansion. Inorganic materials expand and contract very little with thermal changes, and are therefore highly dimensionally stable.

Molding Methods

The exemplary rotor blocking composition 42 can be formed from a variety of molding techniques, such as vacuum casting, compression molding, vented injected molding and compression-injection molding, as will be understood by one skilled in the art. The below-described exemplary molding technique is provided in context of molding an exemplary epoxy resin material 44 and an exemplary E-glass reinforcement material 46. The E-glass reinforcement material is exemplarily provided in both sheet form and fiber form, as explained in more detail below. However, as explained above, other or additional resin materials, reinforcement materials, and/or additives could be used. It will also be understood by one skilled in the art that some or all of the below-described molding steps may be changed as to order, interchanged, modified or even skipped.

To mold the exemplary rotor blocking composition 42, a mold cavity is advantageously preheated to the molding dwell temperature, typically about 100° C. to about 200° and preferably about 130° C. to about 180°. The E-glass reinforcement material, preferably in both prepunched sheet form and fiber form, is placed into the mold cavity. The amounts of oriented sheets and random short fibers should be premeasured to ensure product consistency. The mold cavity is then closed.

The resin, preferably in liquid form, is pumped or otherwise added into the mold cavity along with a curative to advantageously create chemical cross-linking bonds in the resin. Excess resin can be removed through runners or vents during the molding cycle or by other means.

The molding temperature should be applied for about 40 minutes to about 200 minutes to cure the components within the mold cavity, and a pressure up to about several atmospheres may or may not be advantageous for curing. The mold cavity can be quickly cooled (i.e. within about 5 to about 20 minutes) to improve cycle time by suitable means such as flowing water or oil through internal mold tooling cooling channels not in contact with the composition 42. However, the faster the rate of temperature change in the resin during curing and cool-down steps in the molding cycle, the more residual stress and potential for composite shrinkage in the composition 42.

Of course, the above-described exemplary molding method can be modified in a variety of ways. For example, when introducing the reinforcement material 46 into the mold cavity, the reinforcement material 46 can be in the form of dry glass sheets, resin coated glass sheets (e.g. B stage prepreg), or B stage prepreg with a precoated layer of reinforcement material 46 or resin material 44 in fiber or particle 48 form. Also, more than one reinforcement or resin material 44, 46 can be introduced into the mold cavity prior to closing the mold cavity and pumping in the resin material 44. For another example, fibers or particles 48 of reinforcement material 46 can be pumping into the mold cavity along with the resin material 44.

Manufacturing a rotor blocking or other composition 42 from the above-described molding methods provides many advantages over CNC machining. One advantage involves the ability to integrate short fiber reinforcements between oriented planes of glass reinforcement punchings. This increases modulus and strength of the matrix between the glass planes and improves the overall physical properties of the composite 42.

Another advantage involves the ability of making the molding resin composite 42 more transversely isotropic by using random glass matte, fleece or symmetrical woven fabric for the sheet inserts, which can result in a highly transversely isotropic material and makes testing and design much easier. Also, the composite properties in the longitudinal (X—X) and lateral (Y—Y) directions will be essentially the same, while the properties in the traverse (Z—Z) direction will not be the same and can differ significantly, which eliminates testing in all three orientations and makes modeling easier due to the XY direction symmetry.

Another advantage involves the ability to reduce manufacturing parts costs. For example, one family mold die can be used for each type of rotor blocking 34, 36, 38. Thus, referring exemplarily to FIG. 3A, the length of the family mold die can be made coextensive with the longest length of rotor blocking in that family. To manufacture shorter rotor blockings in that family, a tooling insert can be placed within the molding cavity to occupy the space in the molding cavity that is not needed to form the shorter rotor blocking. The die can be made of low cost aluminum or steel, which further helps to reduce manufacturing parts costs to about one-third of CNC machining.

Another advantage of molding involves the elimination of resin matrix dominated strength of raised features or portions in the transverse (Z—Z) direction of the composition 42. CNC machining of laminated sheets results in a generally flat microstructure in these raised portions as shown in FIG. 1A, whereas molding the composition of the present invention results in a generally nonflat, curved, or angular microstructure in these raised portions, as shown in FIG. 4A. This nonflat microstructure provides improved strength to the overall composition 42 and inhibits chipping or flaking off of layers of the composition 42.

Although this invention has been described in terms of certain exemplary uses, preferred embodiments, and possible modifications thereto, other uses, embodiments and possible modifications apparent to those of ordinary skill in the art are also within the spit and scope of this invention. It is also understood that various aspects of one or more features of this invention can be used or interchanged with various aspects of one or more other features of this invention. Accordingly, the scope of the invention is intended to be defined only by the claims that follow.

What is claimed is:

1. A molded rotor block for supporting an end winding extending outwardly from a slot end of a rotor of a power generator, the molded rotor block comprising:
   a molded body comprising integrally molded interior and exterior surface portions defining a shape for supporting the end winding extending outwardly from the slot end of the rotor of the power generator, said molded body comprising
      at least one thermoset resin material having a glass transition temperature above an operating temperature of the power generator, and
      at least one reinforcement material within said at least one thermoset resin material to provide stiffness and strength thereto.

2. The molded rotor block of claim 1, wherein said at least one reinforcement material comprises reinforcing fibers embedded in said at least one thermoset resin material.

3. The molded rotor block of claim 2, wherein said reinforcing fibers are relatively short and are randomly embedded in said at least one thermoset resin material.

4. The molded rotor block of claim 1, wherein said at least one thermoset resin material is a low viscosity liquid prior to thermosetting.

5. The molded rotor block of claim 1, wherein said at least one reinforcement material comprises oriented planes of glass reinforcement punchings.

6. The molded rotor block of claim 1, wherein said at least one reinforcement material is electrically insulative and inhibits electrical conduction along a surface of said molded body.

7. The molded rotor block of claim 1, wherein said at least one reinforcement material comprises at least about 30% of a weight of said molded body.

8. The molded rotor block of claim 1, wherein said molded body has a longitudinal direction, a lateral direction, and a transverse direction; and wherein said molded body has essentially the same properties in the longitudinal and lateral directions and different properties in the transverse direction.

9. The molded rotor block of claim 1, wherein said molded body has at least one raised feature comprising a generally non-flat microstructure.

10. The molded rotor block of claim 1, wherein said molded body has at least one cooling fluid passageway therein.

11. A molded rotor block for supporting an end winding extending outwardly from a slot end of a rotor of a power generator, and comprising:
   a molded body comprising integrally molded interior and exterior surface portions defining a shape for supporting the end winding extending outwardly from the slot end of the rotor of the power generator, said molded body comprising at least one thermoset resin material having a glass transition temperature above an operating temperature of the power generator, and reinforcement fibers randomly embedded within said at least one thermoset resin material and comprising at least about 30% of a weight of said molded body.

12. The molded rotor block of claim 11, wherein said at least one thermoset resin material is a low viscosity liquid prior to thermosetting.

13. The molded rotor block of claim 11, wherein said at least one reinforcement material is electrically insulative and inhibits electrical conduction along a surface of said molded body.

14. The molded rotor block of claim 11, wherein said molded body has at least one cooling fluid passageway therein.

15. A power generator comprising:

a rotor having a plurality of rotor slots therein;

a plurality of end windings extending outwardly from ends of the rotor slots; and at least one molded rotor block for supporting at least one of said end windings and comprising at least one molded body including integrally molded interior and exterior surface portions defining a shape for supporting the at least one end winding;

said at least one molded body comprising at least one thermoset resin material having a glass transition temperature above an operating temperature of the power generator, and at least one reinforcement material within said at least one thermoset resin material to provide stiffness and strength thereto.

16. The power generator of claim 15, wherein said at least one reinforcement material comprises reinforcing fibers embedded in said at least one thermoset resin material.

17. The power generator of claim 16, wherein said reinforcing fibers are relatively short and are randomly embedded in said at least one thermoset resin material.

18. The power generator of claim 15, wherein said at least one reinforcement material is electrically insulative and inhibits electrical conduction along a surface to said at least one molded body.

19. The power generator of claim 15, wherein said at least one reinforcement material comprises at least about 30% of a weight of said at least one molded body.

20. The power generator of claim 15, wherein said at least one molded body has at least one cooling fluid passageway therein.

21. The power generator of claim 15, wherein said at least one molded rotor block comprises at least one of a molded axial rotor block, a molded radial rotor block, and a molded pill rotor block.

* * * * *